(12) United States Patent
Samie et al.

(10) Patent No.: US 10,913,344 B2
(45) Date of Patent: Feb. 9, 2021

(54) DRIVETRAIN FOR A HYBRID PROPULSION SYSTEM

(71) Applicant: GM Global Technology Operations LLC, Detroit, MI (US)

(72) Inventors: Farzad Samie, Franklin, MI (US); Derek F. Lahr, Howell, MI (US); Joel R. Briggs, Clawson, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 44 days.

(21) Appl. No.: 16/299,757

(22) Filed: Mar. 12, 2019

(65) Prior Publication Data
US 2020/0290447 A1  Sep. 17, 2020

(51) Int. Cl.
| | |
|---|---|
| *B60K 6/40* | (2007.10) |
| *F16D 25/10* | (2006.01) |
| *B60K 6/48* | (2007.10) |
| *B60K 6/387* | (2007.10) |
| *B60K 6/547* | (2007.10) |

(52) U.S. Cl.
CPC ............... *B60K 6/40* (2013.01); *B60K 6/387* (2013.01); *B60K 6/48* (2013.01); *F16D 25/10* (2013.01); *B60K 6/547* (2013.01); *B60K 2006/4816* (2013.01)

(58) Field of Classification Search
CPC . B60K 6/40; B60K 6/48; B60K 6/387; B60K 6/547; B60K 2006/4816; F16D 25/10
See application file for complete search history.

(56) References Cited

U.S. PATENT DOCUMENTS

| | | | | |
|---|---|---|---|---|
| 6,490,945 B2* | 12/2002 | Bowen | ............ | B60K 6/52 74/339 |
| 7,125,357 B2* | 10/2006 | Porter | ............ | B60K 6/26 475/5 |
| 9,114,699 B2* | 8/2015 | Takei | ............ | B60K 6/365 |
| 9,527,375 B2* | 12/2016 | Clark | ............ | B60K 6/26 |
| 9,650,032 B2* | 5/2017 | Kotloski | ............ | F16H 3/728 |
| 9,676,267 B2* | 6/2017 | Hirose | ............ | B60K 6/48 |
| 10,578,195 B2* | 3/2020 | Steinberger | ............ | B60K 6/445 |
| 10,584,775 B2* | 3/2020 | Steinberger | ............ | B60K 6/387 |
| 2017/0363180 A1* | 12/2017 | Steinberger | ............ | B60K 6/442 |
| 2017/0370446 A1* | 12/2017 | Steinberger | ............ | B60K 6/442 |
| 2019/0346036 A1* | 11/2019 | Ore | ............ | B60K 6/08 |

* cited by examiner

*Primary Examiner* — Tinh Dang
(74) *Attorney, Agent, or Firm* — Quinn IP Law

(57) ABSTRACT

A drivetrain for a powertrain system is arranged to transfer mechanical power between an internal combustion engine, an electric machine and a driveline. The drivetrain includes a gearbox including an input member disposed on a first end, an output member disposed on a second end and an auxiliary geartrain including a first mechanical drive mechanism, a second mechanical drive mechanism, and an auxiliary driveshaft. The auxiliary driveshaft rotatably couples the first mechanical drive mechanism and the second mechanical drive mechanism. The electric machine includes a stator attached to the second end of the gearbox and annular to the output member of the gearbox. The second mechanical drive mechanism is rotatably coupled to the rotor of the electric machine. The first mechanical drive mechanism is rotatably coupled to the input member of the gearbox. The internal combustion engine is also coupled to the input member of the gearbox.

19 Claims, 7 Drawing Sheets

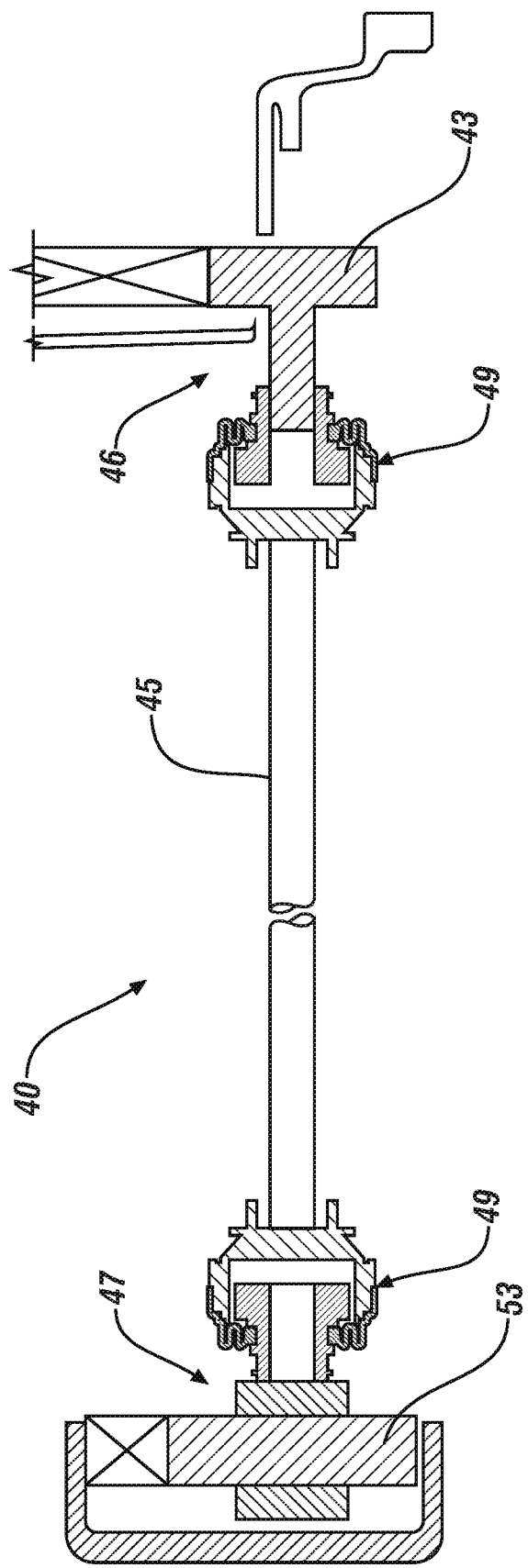

DRIVETRAIN FOR A HYBRID PROPULSION SYSTEM

INTRODUCTION

There is increasing demand for packaging space in underhood and underbody locations on vehicles due at least in part to incorporation of electric-hybrid powertrain system components and associated devices such as battery modules, inverters, cooling systems, controllers, and wiring harnesses.

SUMMARY

The concepts described herein provide a creative arrangement of powertrain and related elements. A drivetrain for a powertrain system is described, and is arranged to transfer mechanical power between an internal combustion engine, an electric machine and a driveline. The drivetrain includes a gearbox including an input member disposed on a first end and an output member disposed on a second end and an auxiliary geartrain including a first mechanical drive mechanism, a second mechanical drive mechanism, and an auxiliary driveshaft. The auxiliary driveshaft rotatably couples the first mechanical drive mechanism and the second mechanical drive mechanism. The electric machine includes a rotor disposed within a stator, wherein the stator is disposed on and attached to the second end of the gearbox, wherein the rotor is disposed annular to the output member of the gearbox, and wherein the second mechanical drive mechanism is rotatably coupled to the rotor of the electric machine. The first mechanical drive mechanism is rotatably coupled to the input member of the gearbox. The internal combustion engine is also coupled to the input member of the gearbox.

An aspect of the disclosure includes the internal combustion engine being coupled to the input member of the gearbox via an interposing clutch and a torque converter.

Another aspect of the disclosure includes the torque converter including an input member coupled to a crankshaft of the internal combustion engine, and an output member of the torque converter coupled to the input member of the gearbox, wherein the internal combustion engine is controllably coupled to the input member of the torque converter via the interposing clutch.

Another aspect of the disclosure includes the torque converter including an input member coupled to a crankshaft of the internal combustion engine, and an output member of the torque converter coupled to the input member of the gearbox. The output member of the torque converter is controllably coupled to the input member of the gearbox via the interposing clutch upstream of the first mechanical drive mechanism.

Another aspect of the disclosure includes an engine disconnect clutch being interposed between the engine and the gearbox.

Another aspect of the disclosure includes the engine disconnect clutch being interposed between the engine and the first mechanical drive mechanism.

Another aspect of the disclosure includes the first mechanical drive mechanism being a first sprocket rotatably coupled to a second sprocket via a coupling mechanism.

Another aspect of the disclosure includes the second mechanical drive mechanism being a first sprocket gear coupled to a second sprocket via a continuous chain.

Another aspect of the disclosure includes a transfer case being coupled to the output member of the gearbox, wherein the transfer case is interposed between the stator of the electric machine and the second end of the gearbox.

Another aspect of the disclosure includes the transfer case including a gearing arrangement that is coupled to a second drive shaft to transfer mechanical power from the gearbox to one of a second differential or a power take-off arrangement.

Another aspect of the disclosure includes the gearbox and the driveline being configured in a transaxle arrangement, wherein the transaxle arrangement is coupled via half-shafts to vehicle drive wheels in a front-wheel drive arrangement, and wherein the rotor is disposed annular to one of the half-shafts and rotates independently of the one of the half-shafts.

Another aspect of the disclosure includes the driveline being arranged in one of a front-wheel drive arrangement, an all-wheel drive arrangement, or rear-wheel drive arrangement.

Another aspect of the disclosure includes the driveline including a driveshaft coupled via axles and a differential to vehicle drive wheels.

Another aspect of the disclosure includes an auxiliary geartrain for a drivetrain that is arranged to transfer mechanical power between an internal combustion engine, a gearbox, an electric machine and a driveline of a vehicle. The auxiliary drivetrain includes a first mechanical drive mechanism, a second mechanical drive mechanism, and an auxiliary driveshaft, wherein the auxiliary driveshaft rotatably couples the first mechanical drive mechanism and the second mechanical drive mechanism. The first mechanical drive mechanism is rotatably coupled to an input member of the gearbox, and the second mechanical drive mechanism is rotatably coupled to a rotor of the electric machine.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIG. 3-1 schematically shows another embodiment of a drivetrain arranged to transfer mechanical power between an internal combustion engine, an electric machine and a driveline in a transverse arrangement, in accordance with the disclosure.

FIG. 3-2 schematically shows another embodiment of a drivetrain arranged to transfer mechanical power between an internal combustion engine, an electric machine and a driveline in a transverse arrangement, in accordance with the disclosure.

FIG. 6 schematically illustrates a cut-away side-view of portions of the auxiliary geartrain, including an auxiliary driveshaft, a first mechanical drive mechanism, and a second mechanical drive mechanism, in accordance with the disclosure.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. For purposes of convenience and clarity only, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

Figure 1:
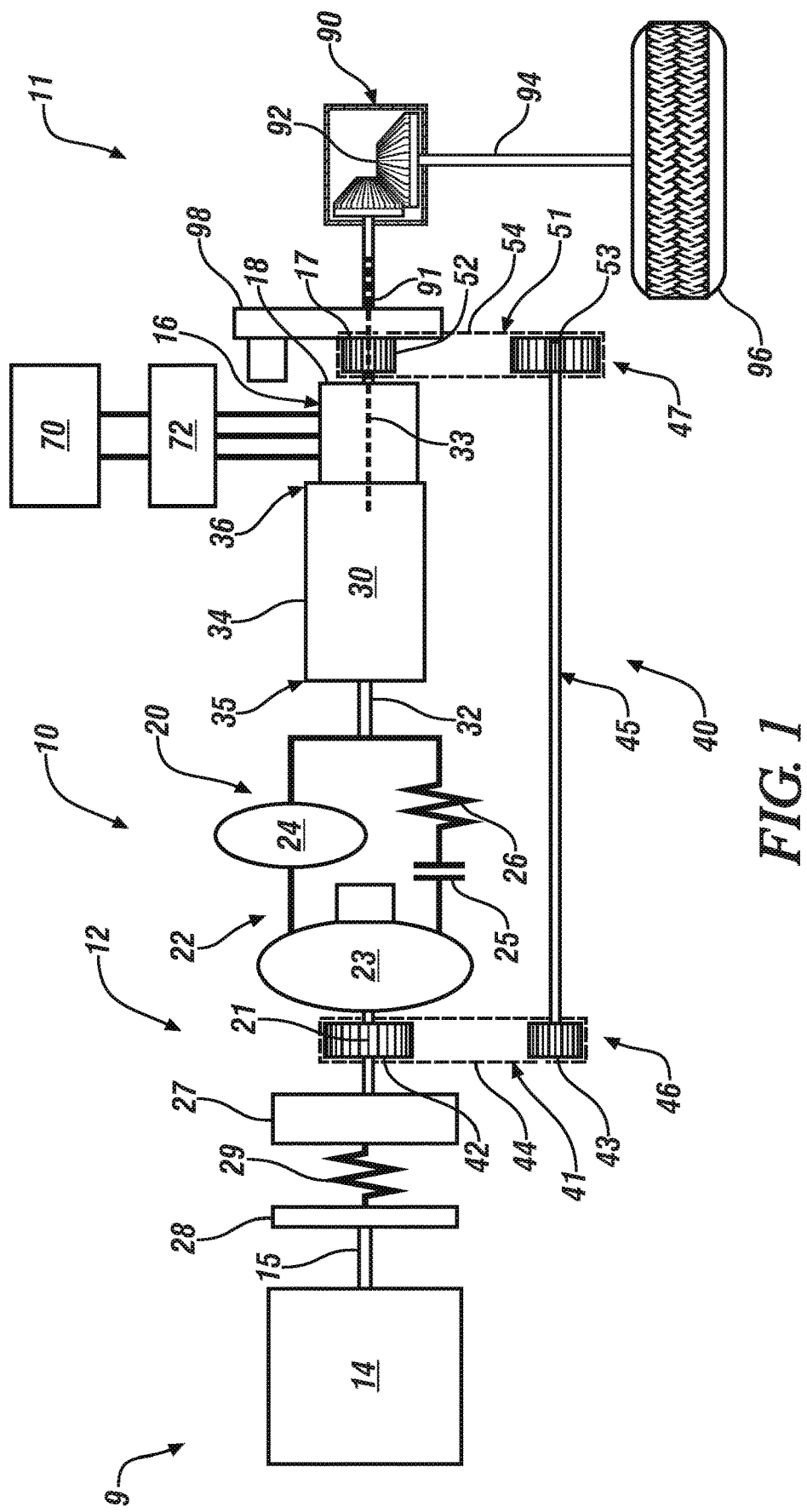
FIG. 1 schematically shows an embodiment of a drivetrain arranged to transfer mechanical power between an internal combustion engine, an electric machine and a driveline in a longitudinal arrangement, in accordance with the disclosure.
Figure 2:
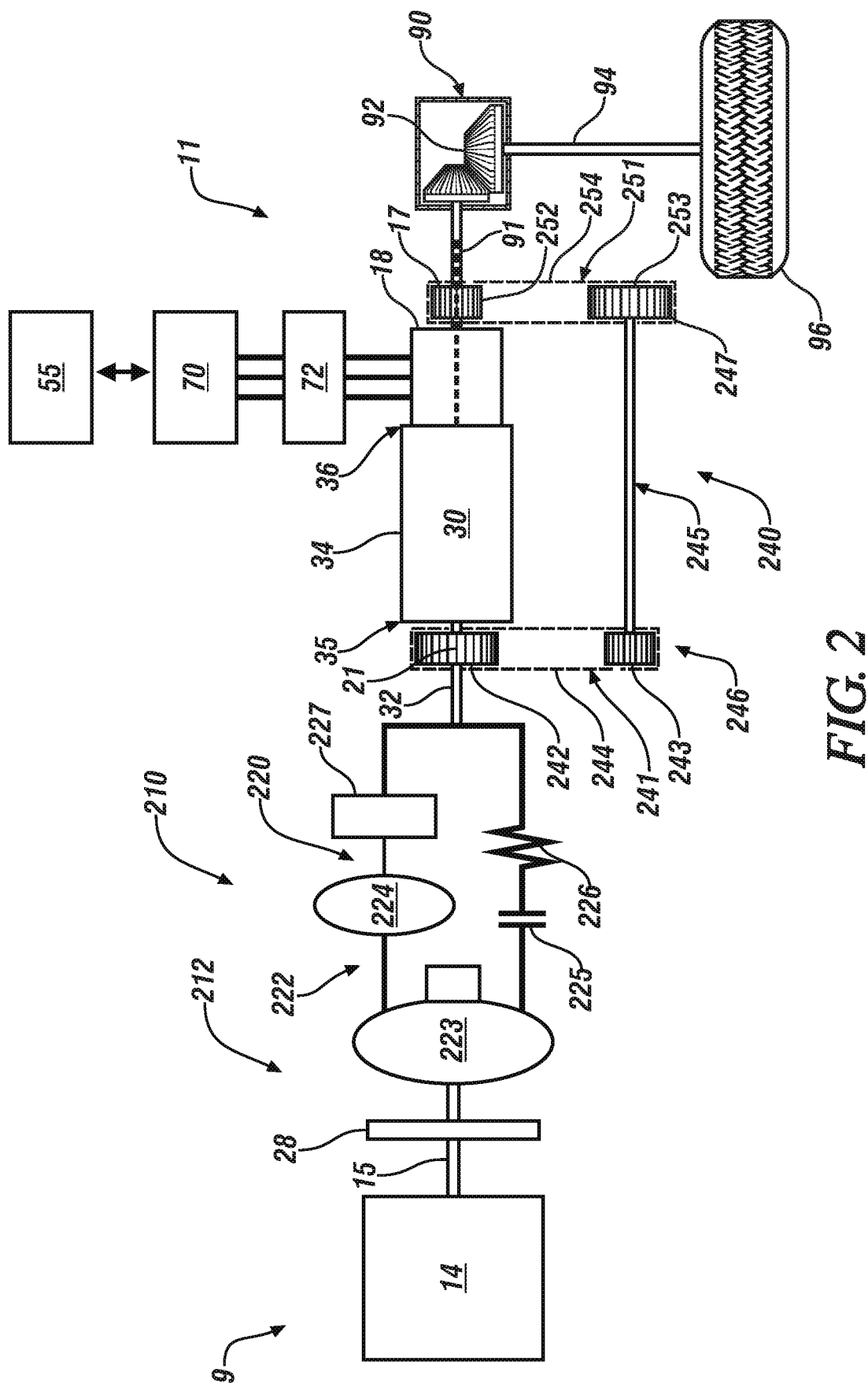
FIG. 2 schematically shows another embodiment of a drivetrain arranged to transfer mechanical power between an internal combustion engine, an electric machine and a driveline in a longitudinal arrangement, in accordance with the disclosure.
Figures 1, 3:
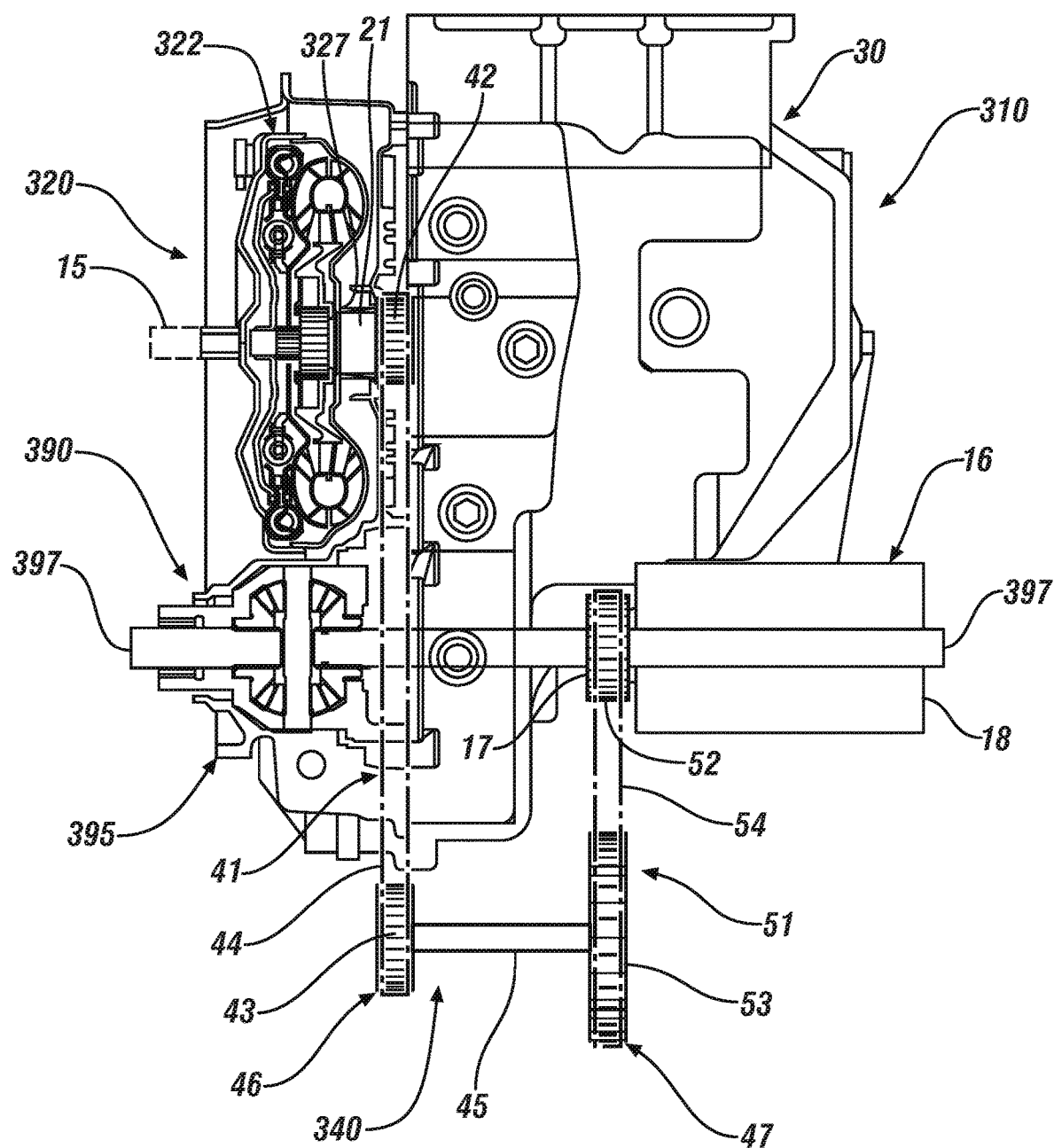
Figures 2, 3:
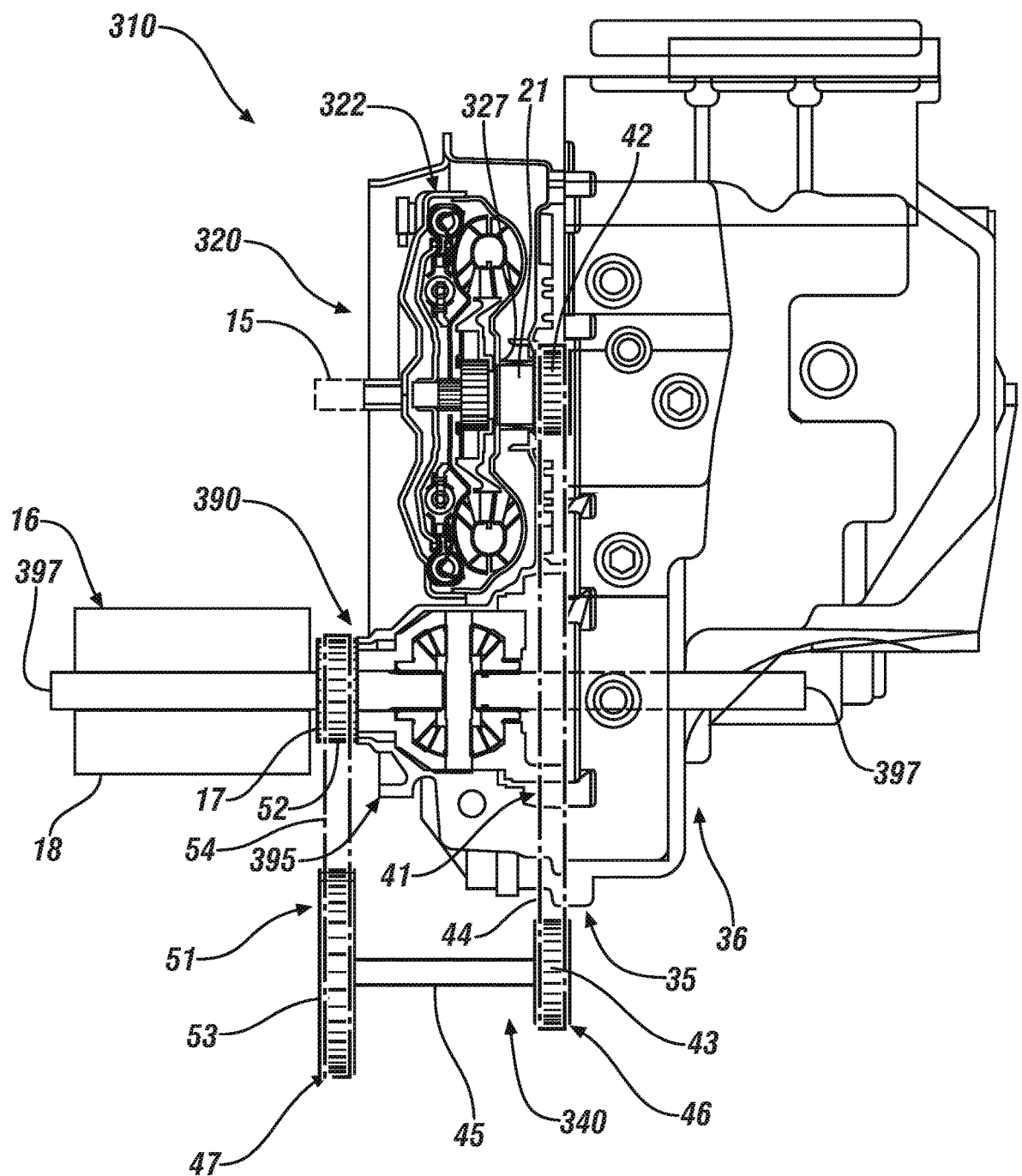

Referring to the drawings, wherein like reference numerals correspond to like or similar components throughout the several Figures, FIGS. 1, 2 and 3 schematically illustrate embodiments of a drivetrain for a hybrid propulsion system wherein each of the embodiments includes an internal combustion engine (engine) 14, an electric machine 16, a gearbox 30, and an auxiliary geartrain 40. In each of the embodiments, the electric machine 16 is arranged on a second, posterior end 36 of the gearbox 30, and the engine 14 is arranged to transfer torque to an input member 32 of the gearbox 30 that is arranged on a first, anterior end 35 of the gearbox 30. The auxiliary geartrain 40 is arranged to transfer mechanical power from the electric machine 16 to the input member 32 of the gearbox 30. The gearbox 30 includes an output member 33 that is arranged on the second end 36 and is coupled to a driveline 90 to transfer mechanical power to one or multiple drive wheel(s) 96 on a vehicle 10. The drivetrain described here may be referred to as a P2 hybrid configuration, which describes an arrangement of elements wherein an electric machine is arranged to introduce torque into a drivetrain between an internal combustion engine and a gearbox of a transmission. The vehicle 10 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. Operations of the engine 14, electric machine 16, and gearbox 30 are controlled by a controller architecture 55, which may be composed of a single one or a plurality of controllers that are arranged to monitor inputs from sensors and execute algorithms to control actuators in response to operator commands.

Referring again to FIG. 1, a first embodiment of a novel hybrid propulsion system 12 is schematically illustrated, and includes a drivetrain 20 that is coupled to a driveline 90 to transfer mechanical power to drive wheel(s) 96 of a vehicle 10. The drivetrain 20 is an element of the hybrid propulsion system 12, which includes the engine 14, electric machine 16 and drivetrain 20 arranged along an axis that is parallel to a longitudinal axis of the vehicle 10. In one embodiment and as shown, the engine 14 is disposed towards a first end 9 of the vehicle 10 and the drive wheel(s) 96 is disposed towards a second end 11 of the vehicle 10, in a rear-wheel drive arrangement. The drivetrain 20 includes a torque converter 22, a gearbox 30, and the auxiliary geartrain 40.

Figure 5:
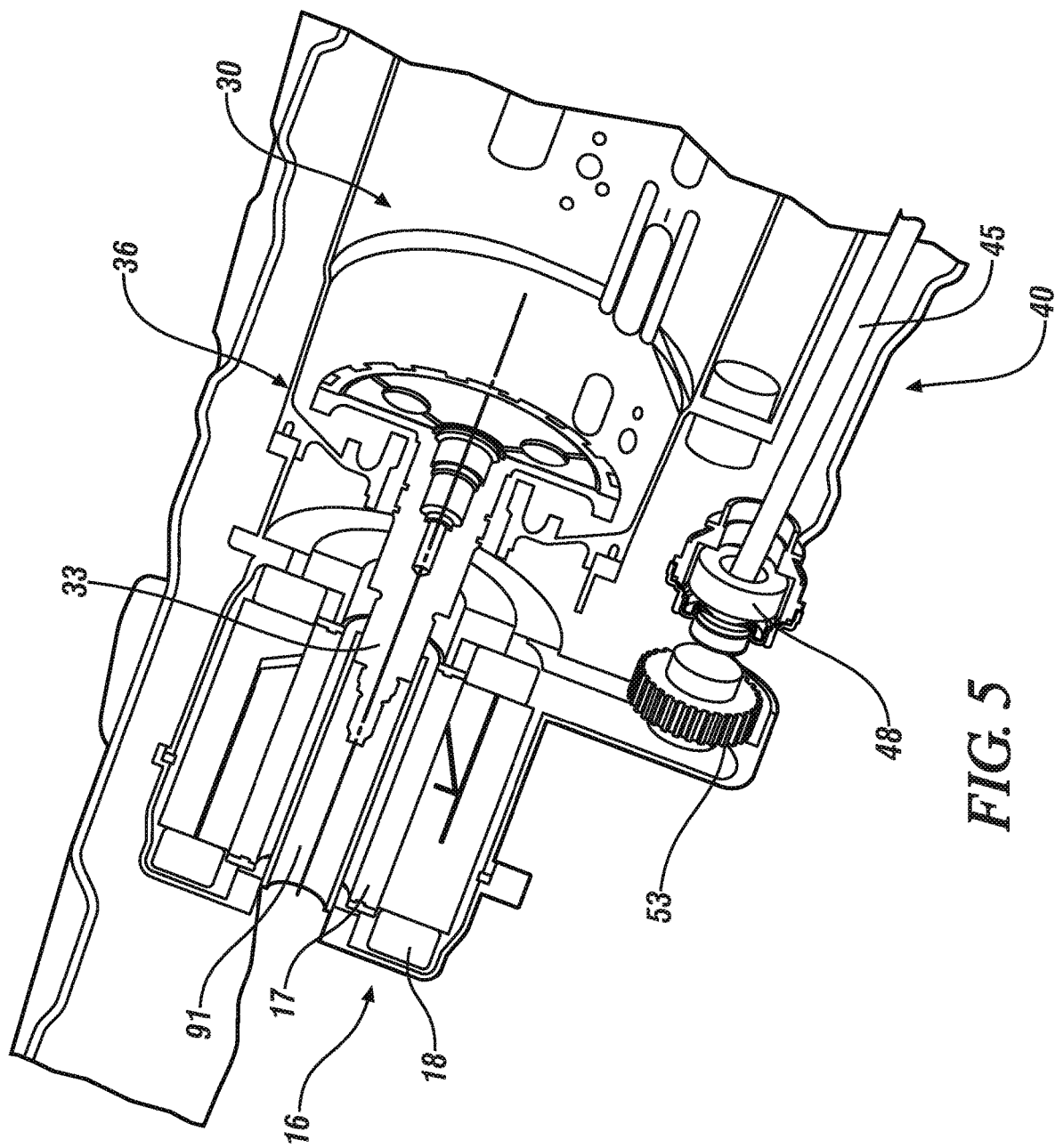
FIG. 5 schematically illustrates a three-dimensional cut-away isometric drawing including a top view of an embodiment of the gearbox, the electric machine and portions of the auxiliary geartrain, in accordance with the disclosure.

The electric machine 16 includes a rotor 17 and a stator 18, and is arranged on a second end 36 of the gearbox 30 annular to an output member 33 thereof, and the rotor 17 rotates independently from rotation of the output member 33. The auxiliary geartrain 40 is arranged to transfer mechanical power between the rotor 17 and the input member 32 of the gearbox 30. These elements are also shown isometrically with reference to FIG. 5. The auxiliary geartrain 40 is arranged to transfer mechanical power between the electric machine 16 and the input member 32 of the gearbox 30, and includes a first mechanical drive mechanism 41 that is rotatably coupled to a second mechanical drive mechanism 51 via an auxiliary driveshaft 45.

Figure 4:
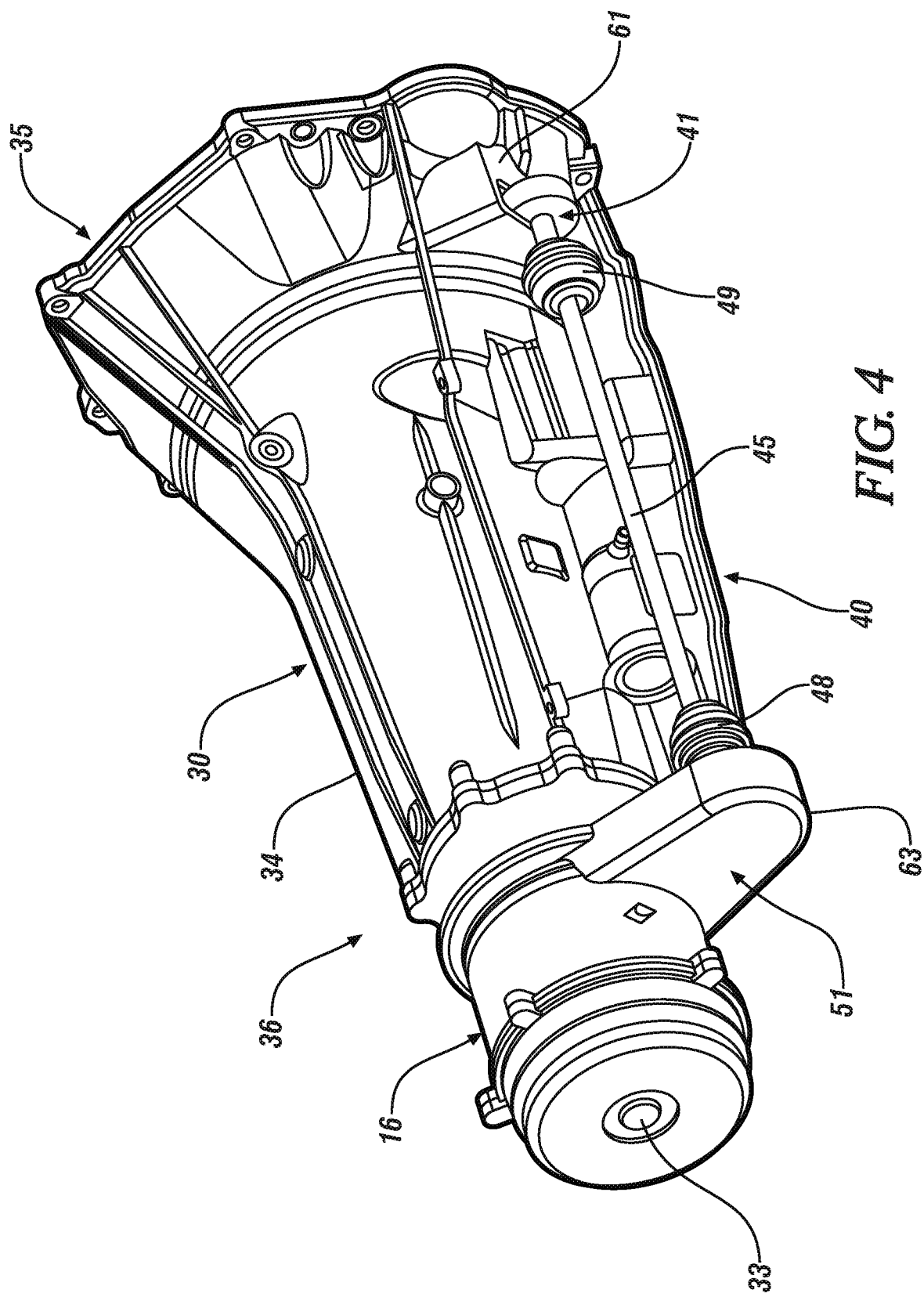
FIG. 4 schematically illustrates a three-dimensional partial cut-away isometric drawing including an upper side-view of an embodiment of the gearbox and portions of the auxiliary geartrain, in accordance with the disclosure.

The first mechanical drive mechanism 41 includes a first rotating member 42 that is rotatably linked to a second rotating member 43 via a mechanical linkage 44 to transfer torque. The first rotating member 42 is attached to a hub 21 of a pump portion 23 of the torque converter 22, and the second rotating member 43 is coupled to a first end 46 of the auxiliary driveshaft 45 via a universal joint 49. In one embodiment, the first and second rotating members 42, 43 are sprockets, and the mechanical linkage 44 is a continuous chain. Alternatively, the first mechanical drive mechanism 41 may be arranged as a meshing gearset, a belt-and-pulley arrangement, or another arrangement. The gear ratio or speed ratio between the first and second rotating members 42, 43 may be arranged in either an underdrive ratio or an overdrive ratio, depending upon the relative power output capacities of the electric machine 16 and the engine 14, and other factors. In one embodiment, the gear ratio is 2.5:1. The first mechanical drive mechanism 41 may be disposed within a first housing portion 61 that connects to the case 34 of the gearbox 30, as shown with reference to FIG. 4. Portions of the auxiliary geartrain 40 and the first mechanical drive mechanism 41 are also illustrated with reference to FIG. 6.

The second mechanical drive mechanism 51 includes a first rotating member 52 that is rotatably linked to a second rotating member 53 via a mechanical linkage 54 to transfer torque. The first rotating member 52 is attached to the rotor 17 of the electric machine 16, and the second rotating member 43 is coupled to a second end 47 of the auxiliary driveshaft 45 via a universal joint 48. In one embodiment, the first and second rotating members 52, 53 are sprockets, and the mechanical linkage 54 is a continuous chain. Alternatively, the first mechanical drive mechanism 51 may be arranged as a meshing gearset, a belt-and-pulley, or another arrangement. The gear ratio or speed ratio between the first and second rotating members 52, 53 may be arranged in either an underdrive ratio or an overdrive ratio, depending upon the relative power output capacities of the electric machine 16 and the engine 14, and other factors. In one embodiment, the gear ratio is 1:2.5. The second mechanical drive mechanism 51 may be disposed within a second housing portion 63 that connects to the case 34 of the gearbox 30, as shown with reference to FIG. 4. Portions of the auxiliary geartrain 40 and the second mechanical drive mechanism 51 are also illustrated with reference to FIG. 6.

The engine 14 is preferably configured as a multi-cylinder internal combustion engine that converts fuel to mechanical torque through a thermodynamic combustion process. The engine 14 is equipped with a plurality of actuators and sensing devices for monitoring operation and delivering fuel to form in-cylinder combustion charges that generate an expansion force onto pistons, with such force transferred to the crankshaft 15 to produce torque. The engine 14 includes a crankshaft 15 that is coupled to the pump portion 23 of the torque converter 22 via an intervening flexplate 28, damper 29 and disconnect clutch 27. The disconnect clutch 27 selectively couples the engine 14 to the pump portion 23 of the torque converter 22 in one embodiment. In one embodiment, the disconnect clutch 27 is a selectable mechanical diode, such as a one-way clutch or a selectable one-way clutch.

The torque converter 22 is a rotatable torque coupling device arranged between the engine 14 and the input member 32 of the gearbox 30. The torque converter 22 preferably includes the pump 23 rotatably coupled to the crankshaft 15, a stator element 26, a turbine 24 that is rotatably coupled to the input member 64 to the gearbox 30 and a torque converter clutch 25. As previously indicated, the pump 23 includes the pump hub 21 that couples to the first rotating member 42 of the first mechanical drive mechanism 41. The torque converter 22 operates to provide fluid torque coupling between the pump 23 and the turbine 24 when the torque converter clutch 25 is deactivated or released, and provides mechanical torque coupling between the pump 23 and the turbine 24 when the torque converter clutch 25 is activated. The turbine 24 couples to the input member 32 of the gearbox 30, with the torque converter clutch 25 and damper 26 being arranged in parallel to manage torque transfer thereto. In this embodiment, the pump portion 23 of the torque converter 22 includes the pump hub 21, and the first rotating member 42 of the first mechanical drive mechanism 41 is attached to the pump hub 21 and rotates therewith.

The electric machine 16 is arranged on the second end 36 of the gearbox 30 with the stator 18 being mechanically mounted on and coupled to the case 34 of the gearbox 30. The rotor 17 and stator 18 are coaxial with and annular to the output member 33 of the gearbox 30, and the rotor 17 rotates independently from rotation of the output member 33. The rotor 17 is arranged as a cylindrical device having a hub portion that extends outside of the stator 18. A coaxial first rotating member 52 of the second mechanical drive mechanism 51 is attached to the hub portion of the rotor 17 and rotates therewith. The electric machine 16 is arranged as a multi-phase electric motor/generator that is configured to convert stored electric energy to mechanical power and convert mechanical power to electric energy that may be stored in a DC power source 70. The DC power source 70 may be configured at a nominal 48-volt DC voltage level in one embodiment. Alternatively, the DC power source 70 may be configured at a nominal 300 volt DC voltage level, or another suitable voltage level, as may be selected. The electric machine 16 electrically connects via an inverter module 72 to the DC power source 70. Alternatively, another non-combustion torque machine, such as a pneumatically-powered device or a hydraulically-powered device may be employed in place of the electric machine 16. By way of definition, a non-combustion torque machine is a device that is capable of generating torque by converting a potential energy source to kinetic energy without combustion of the potential energy. Non-limiting examples of the potential energy source may include electric energy, pneumatic energy and hydraulic energy.

The gearbox 30 includes one or a plurality of meshed gears, geartrains, clutches, pulleys, chain drives, etc. (not shown) that are disposed in the case 34 and are arranged to provide speed and/or torque conversion between the engine 14, the electric machine 16 and the driveline 90. The gearbox 30 may be arranged in a step-gear configuration in one embodiment, and may include one or more differential gearsets and activatable clutches configured to effect torque transfer in one of a plurality of fixed gear states over a range of speed ratios between the engine 14, the input member 32 and the output member 33. Alternatively, the gearbox 30 may be configured as a manual transmission, a continuously-variable transmission (CVT), a dual-clutch transmission (DCT), or another suitable arrangement. The output member 33 of the gearbox 30 is rotatably coupled to an input member 91 of the differential gearset 92 either directly, or via a chain drive mechanism, a meshed gearset, or another suitable torque transmission configuration.

In one embodiment, and as shown, a transfer case 98 may be interposed between the case 34 and the electric machine 16. The transfer case 98 may be rotatably coupled to the output member 33 of the gearbox 30, and also rotatably coupled to the input member 91 of the differential gearset 92. The transfer case 98 includes a gearing arrangement that couples to a second drive shaft (not shown) to transfer mechanical power from the gearbox 30 to a second on-vehicle device, such as to a second differential to effect 4WD (four wheel drive) operation, or to a PTO (power take-off) arrangement to power an auxiliary device such as an electrical generator.

The driveline 90 is disposed to transfer propulsion power between the gearbox 30 and the drive wheel(s) 96 via an axle 94, which is coupled to the differential gearset 92. The driveline 90 may be disposed in either a front-wheel drive configuration, as shown with reference to FIGS. 3-1 and 3-2, a rear-wheel drive configuration as shown with reference to FIGS. 1 and 2, or a four-wheel drive configuration, as shown with reference to FIG. 1. The driveline 90 is configured to transfer tractive power between the output member 33 of the gearbox 30, the electric machine 16 and a road surface via the drive wheel(s) 96. The driveline 90 is illustrative, and the concepts described herein apply to other drivetrain systems that are similarly configured.

The inverter module 72 is preferably configured with an MGU controller and suitable control circuits including power transistors, e.g., integrated gate bipolar transistors (IGBTs) for transforming DC electric power to AC electric power and transforming AC electric power to DC electric power. The inverter module 72 may employ pulsewidth-modulating (PWM) control of the IGBTs to convert stored DC electric power originating in the DC power source 70 to AC electric power to drive the electric machine 16 to generate torque. Similarly, the inverter module 72 converts mechanical power transferred to the electric machine 16 to DC electric power to generate electric energy that is storable in the DC power source 70, including as part of a regenerative braking control strategy. The MGU controller of the inverter module 72 receives motor control commands from the controller 55 and controls inverter states to provide a desired motor drive operation or a regenerative braking operation. In one embodiment, an auxiliary DC/DC electric power converter electrically connects via a high-voltage bus to the DC power source 70, and provides electric power to charge the low-voltage battery via a low-voltage bus. The low-voltage battery provides low-voltage electric power to low-voltage systems on the vehicle, including, e.g., a starter, electric windows, HVAC fans, seats, and other devices. In one embodiment the low-voltage battery is configured to operate at a nominal 12 VDC voltage level. The DC power source 70 is preferably disposed to supply electric power at a suitable voltage level, and may be one of multiple embodiments of a DC power source, e.g., a multi-cell lithium ion device, an ultra-capacitor, or another suitable device without limitation. Monitored parameters related to the DC power source 70 preferably include a state of charge (SOC), temperature, and others. In one embodiment, the DC power source 70 may electrically connect via an on-vehicle battery charger to a remote, off-vehicle electric power source for charging while the vehicle is stationary.

The controller 55 may signally connect to an operator interface (not shown), and operates to provide hierarchical control of a plurality of control devices to effect operational control of individual elements, including, e.g., the inverter module 72, the engine 14 and the gearbox 30. The controller 55 communicates with each of the inverter module 72, the engine 14 and the gearbox 30, either directly or via a communication bus to monitor operation and control operations thereof.

The terms controller, control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions, including monitoring inputs from sensing devices and other networked controllers and executing control and diagnostic routines to control operation of actuators. Routines may be periodically executed at regular intervals, or may be executed in response to occurrence of a triggering event. Communication between controllers, and communication between controllers, actuators and/or sensors may be accomplished using a direct wired link, a networked communications bus link, a wireless link, a serial peripheral interface bus or another suitable communication link. Communications includes exchanging data signals in a suitable form, including, for example, electrical signals via a conductive medium, electromagnetic signals via air, optical signals via optical waveguides, and the like. Data signals may include signals representing inputs from sensors, signals representing actuator commands, and communications signals between controllers.

FIG. 2 schematically illustrates another embodiment of a novel hybrid propulsion system 212, and includes a drivetrain 220 that is coupled to a driveline 90 to transfer mechanical power to drive wheel(s) 96 of a vehicle 210. In this embodiment, the engine 14, electric machine 16 and drivetrain 220 are arranged along an axis that is parallel to a longitudinal axis of the vehicle 210, analogous to the rear-wheel drive arrangement shown with reference to FIG. 1. In this embodiment, the drivetrain 220 includes torque converter 222, gearbox 30, and auxiliary geartrain 240, wherein the auxiliary geartrain 240 includes a first mechanical drive mechanism 241 that is rotatably coupled to a second mechanical drive mechanism 251 via an auxiliary driveshaft 245, and wherein the first and second mechanical drive mechanisms 241, 251 are arranged to transfer mechanical power between the electric machine 16 and the input member 32 of the gearbox 30. The second mechanical drive mechanism 251 includes a first rotating member 252 that is rotatably linked to a second rotating member 253 via a mechanical linkage 254 to transfer torque. The first rotating member 252 is attached to the rotor 17 of the electric machine 16, and the second rotating member 243 is coupled to a second end 247 of the auxiliary driveshaft 245.

The engine 14 is coupled to the torque converter 222 via the intervening flexplate 28. The torque converter 222 includes a pump portion 223, turbine 224, torque converter clutch 225, damper 226 and a disconnect clutch 227. The disconnect clutch 227 selectively couples the turbine 224 to the input member 32 of the gearbox 30 in one embodiment. In one embodiment, the disconnect clutch 227 is a selectable mechanical diode, such as a one-way clutch or a selectable one-way clutch.

The first mechanical drive mechanism 241 includes the first rotating member 242 being rotatably linked to the second rotating member 243 via the mechanical linkage 244, with the first rotating member 242 being attached to the input member 32 of the gearbox 30, and the second rotating member 243 being coupled to a first end 246 of the auxiliary driveshaft 245. The second mechanical drive mechanism 251 includes the first rotating member 252 being attached to the rotor 17 of the electric machine 16, and the second rotating member 243 being coupled to the second end 247 of the auxiliary driveshaft 245.

FIG. 3-1 schematically illustrates another embodiment of a novel hybrid propulsion system 312, and includes a drivetrain 320 that is coupled to a driveline 390 to transfer mechanical power to drive wheel(s) of a vehicle 310. In this embodiment, the engine 14, electric machine 16 and drivetrain 320 are arranged along an axis that is transverse to a longitudinal axis of the vehicle 310, and the electric machine 16 is disposed on a nominally rightward side of the vehicle 310. The output member 33 of the gearbox 30 is rotatably coupled to a transaxle device 395, which distributes and transfers torque via half-shafts 397 to the vehicle wheel(s), which may be in a front-wheel drive arrangement in one embodiment.

The drivetrain 320 includes torque converter 322, gearbox 30, and auxiliary geartrain 40, wherein the auxiliary geartrain 340 includes a first mechanical drive mechanism 41 that is rotatably coupled to a second mechanical drive mechanism 51 via an auxiliary driveshaft 45, and wherein the first and second mechanical drive mechanisms 41, 51 are arranged to transfer mechanical power between the electric machine 16 and the input member 32 of the gearbox 30.

The engine 14 is coupled to the torque converter 322 via an intervening flexplate. The torque converter 322 includes a pump portion, turbine, torque converter clutch, damper and a disconnect clutch 327. The disconnect clutch 327 selectively couples the turbine to the input member 32 of the gearbox 30 in one embodiment. In one embodiment, the disconnect clutch 327 is a selectable mechanical diode, such as a one-way clutch or a selectable one-way clutch.

In this embodiment, the first mechanical drive mechanism 41 includes the first rotating member 42 being rotatably linked to the second rotating member 43 via the mechanical linkage 44, with the first rotating member 42 being attached to the input member 32 of the gearbox 30, and the second rotating member 43 being coupled to a first end 46 of the auxiliary driveshaft 45. The second mechanical drive mechanism 51 includes the first rotating member 52 being attached to the rotor 17 of the electric machine 16, and the second rotating member 43 being coupled to the second end 47 of the auxiliary driveshaft 45. In this embodiment the electric machine 16 is arranged with the first rotating member 52 being attached to the rotor 17 of the electric machine 16 such that it is interposed between the stator 18 and the transaxle device 395 on the nominally rightward side of the transaxle device 395 as shown. This arrangement facilitates a compact design that minimizes effect on underhood packaging space.

FIG. 3-2 schematically illustrates another embodiment of a novel hybrid propulsion system 312, and includes a drivetrain 320 that is coupled to a driveline 390 to transfer mechanical power to drive wheel(s) of a vehicle 310. In this embodiment, the engine 14, electric machine 16 and drivetrain 320 are arranged along an axis that is transverse to a longitudinal axis of the vehicle 310, and the electric machine 16 is disposed on a nominally leftward side of the vehicle 310. The output member 33 of the gearbox 30 is rotatably coupled to a transaxle device 395, which distributes and transfers torque via half-shafts 397 to the vehicle wheel(s), which may be in a front-wheel drive arrangement in one embodiment. The rotor 17 and stator 18 are coaxial with and annular to one of the half-shafts 397 of the gearbox 30, and the rotor 17 rotates independently from rotation of the half-shaft 397. This arrangement may be instead employed in an all-wheel drive configuration. In this embodiment the electric machine 16 is arranged with the first rotating member 52 being attached to the rotor 17 of the electric machine 16 such that it is interposed between the stator 18 and the transaxle device 395 on the nominally leftward side of the transaxle device 395 as shown. This arrangement facilitates a compact design that minimizes effect on underhood packaging space.

The concepts described herein provide a novel arrangement of elements that may alleviate underbody and underhood packaging constraints by providing an inline P2 hybrid configuration that can be deployed in a rear-wheel drive vehicle, in one embodiment. Such an arrangement facilitates deployment of hybrid powertrain systems into rear-wheel drive and four-wheel drive vehicles.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A drivetrain for a powertrain system, wherein the drivetrain is arranged to transfer mechanical power/torque between an internal combustion engine, an electric machine and a driveline of a vehicle, the drivetrain including:
    a gearbox including an input member disposed on a first end and an output member disposed on a second end; and
    an auxiliary geartrain including a first mechanical drive mechanism, a second mechanical drive mechanism, and an auxiliary driveshaft;
    wherein the auxiliary driveshaft rotatably couples the first mechanical drive mechanism and the second mechanical drive mechanism;
    wherein the electric machine includes a rotor disposed within a stator;
    wherein the stator is disposed on and attached to the second end of the gearbox;
    wherein the rotor is disposed annular to the output member of the gearbox and rotates independently of the output member;
    wherein the first mechanical drive mechanism is rotatably coupled to the input member of the gearbox;
    wherein the second mechanical drive mechanism is rotatably coupled to the rotor of the electric machine; and
    wherein the internal combustion engine is coupled to the input member of the gearbox via an interposing clutch and a torque converter.

2. The drivetrain of claim 1, wherein the torque converter includes an input member coupled to a crankshaft of the internal combustion engine, and an output member of the torque converter coupled to the input member of the gearbox; and
    wherein the internal combustion engine is controllably coupled to the input member of the torque converter via the interposing clutch.

3. The drivetrain of claim 1, wherein the torque converter includes an input member coupled to a crankshaft of the internal combustion engine, and an output member of the torque converter coupled to the input member of the gearbox; and
    wherein the output member of the torque converter is controllably coupled to the input member of the gearbox via the interposing clutch upstream of the first mechanical drive mechanism.

4. The drivetrain of claim 1, further comprising an engine disconnect clutch being interposed between the internal combustion engine and the gearbox.

5. The drivetrain of claim 4, wherein the engine disconnect clutch is interposed between the internal combustion engine and the first mechanical drive mechanism.

6. The drivetrain of claim 1, wherein the first mechanical drive mechanism comprises a first pulley/sprocket rotatably coupled to a second sprocket via a coupling mechanism.

7. The drivetrain of claim 1, wherein the second mechanical drive mechanism comprises a first sprocket gear coupled to a second sprocket via one of a continuous chain, meshing gearset, or a belt-and-pulley mechanism.

8. The drivetrain of claim 1, further comprising a transfer case coupled to the output member of the gearbox, wherein the transfer case is attached to the stator of the electric machine.

9. The drivetrain of claim 8, wherein the transfer case includes a gearing arrangement that is coupled to a second drive shaft to transfer mechanical power from the gearbox to one of a second differential or a power take-off arrangement.

10. The drivetrain of claim 1, further comprising the gearbox and the driveline being configured in a transaxle arrangement, wherein the transaxle arrangement is coupled via half-shafts to vehicle drive wheels, and wherein the second mechanical drive mechanism of the auxiliary geartrain is coupled to one of the half-shafts.

11. The drivetrain of claim 10, wherein the gearbox and the driveline are arranged in a front-wheel drive arrangement.

12. The drivetrain of claim 1, wherein the driveline comprises a driveshaft coupled via axles and a differential to vehicle drive wheels.

13. The drivetrain of claim 12, wherein the driveline is arranged in a rear-wheel drive arrangement.

14. An auxiliary geartrain for a drivetrain that is arranged to transfer mechanical power between an internal combustion engine, a gearbox, an electric machine and a driveline, the auxiliary geartrain including:
a first mechanical drive mechanism, a second mechanical drive mechanism, and an auxiliary driveshaft;
wherein the auxiliary driveshaft rotatably couples the first mechanical drive mechanism and the second mechanical drive mechanism;
wherein the electric machine includes a rotor disposed within a stator;
wherein the stator is disposed on and attached to a second end of the gearbox;
wherein the rotor is disposed annular to an output member of the gearbox and rotates independently of the output member;
wherein the first mechanical drive mechanism is rotatably coupled to an input member of the gearbox; and
wherein the second mechanical drive mechanism is rotatably coupled to the rotor of the electric machine; and
wherein the internal combustion engine is coupled to the input member of the gearbox via an interposing clutch and a torque converter.

15. The auxiliary geartrain of claim 14, wherein the first mechanical drive mechanism comprises a first pulley/sprocket rotatably coupled to a second sprocket via a coupling mechanism.

16. The auxiliary geartrain of claim 14, wherein the second mechanical drive mechanism comprises a first sprocket gear coupled to a second sprocket via a continuous chain.

17. The auxiliary geartrain of claim 14, further comprising the gearbox and the driveline being configured in a transaxle arrangement, wherein the transaxle arrangement is coupled via half-shafts to vehicle drive wheels in a front-wheel drive arrangement, and wherein the rotor is disposed annular to one of the half-shafts and rotates independently of the one of the half-shafts.

18. The auxiliary geartrain of claim 14, further comprising the gearbox and the driveline being configured in a transaxle arrangement, wherein the transaxle arrangement is coupled via half-shafts to vehicle drive wheels in an all-wheel drive arrangement, and wherein the rotor is disposed annular to one of the half-shafts and rotates independently of the one of the half-shafts.

19. The auxiliary geartrain of claim 14, wherein the driveline comprises a driveshaft coupled via axles and a differential to vehicle drive wheels.

* * * * *